United States Patent [19]

Jackovitz et al.

[11] Patent Number: 4,481,128
[45] Date of Patent: Nov. 6, 1984

[54] ALKALI SLURRY OZONATION TO PRODUCE A HIGH CAPACITY NICKEL BATTERY MATERIAL

[75] Inventors: John F. Jackovitz, Monroeville; Earl A. Pantier, Penn Hills, both of Pa.

[73] Assignee: Westinghouse Electric Corp., Pittsburgh, Pa.

[21] Appl. No.: 356,687

[22] Filed: Mar. 10, 1982

Related U.S. Application Data

[62] Division of Ser. No. 229,360, Jan. 29, 1981, Pat. No. 4,330,603.

[51] Int. Cl.³ ............................................. H01M 4/88
[52] U.S. Cl. ................................. 252/182.1; 252/519; 429/206; 429/223
[58] Field of Search ..................... 252/519, 518, 182.1; 429/206, 223, 207; 204/2.1, 56 R, 48 R, 153; 923/581, 592, 594; 106/306; 75/119; 29/623.1, 623.5

[56] References Cited

U.S. PATENT DOCUMENTS

| | | | |
|---|---|---|---|
| 3,436,267 | 4/1969 | Faber | 204/157 R |
| 3,579,385 | 5/1971 | Feduska et al. | 204/2.1 |
| 3,600,227 | 8/1971 | Hardman | 204/56 R |
| 4,356,101 | 10/1982 | Jackovity et al. | 252/519 |
| 4,381,258 | 4/1983 | Mehaute et al. | 252/182.1 |
| 4,386,019 | 5/1983 | Koren et al. | 252/519 |
| 4,390,461 | 6/1983 | Tsuhujama et al. | 252/182.1 |

Primary Examiner—Josephine L. Barr
Attorney, Agent, or Firm—D. P. Cillo

[57] ABSTRACT

A high capacity battery material is made, consisting essentially of hydrated Ni(II) hydroxide, and about 5 wt. % to about 40 wt. % of Ni(IV) hydrated oxide interlayer doped with alkali metal cations selected from potassium, sodium and lithium cations.

4 Claims, 3 Drawing Figures (A) 3hr. OZONATION—Ni(III) HYDROXIDE
(B) 6hr. OZONATION—Ni(III) HYDROXIDE
(C) Ni(II) HYDROXIDE THEORETICAL OUTPUT—ONE ELECTRON/Ni ATOM (A) 3.0% Co(OH)$_2$ 3hr. OZONATION
(B) 4.5% Co(OH)$_2$ 3hr. OZONATION
(C) 4.5% Co(OH)$_2$ 6hr. OZONATION
(D) NO Co(OH)$_2$ 3hr. OZONATION

ALKALI SLURRY OZONATION TO PRODUCE A HIGH CAPACITY NICKEL BATTERY MATERIAL

GOVERNMENT CONTRACT

This invention was made or conceived in the course of or under Contract No. 31-109-38-4141, with the U.S. Government as represented by the U.S. Department of Energy.

This is a division of application Ser. No. 229,360, filed Jan. 29, 1981, now U.S. Pat. No. 4,330,603.

BACKGROUND OF THE INVENTION

Presently used methods for the preparation of nickel active battery material involve chemical precipitation or electrochemical precipitation of nickel (II) hydroxide, as taught for example by Feduska et. al. in U.S. Pat. No. 3,579,385 and Hardman in U.S. Pat. No. 3,600,227. However, chemical precipitation processes produce a gelatinous material which is difficult to load into a conducting plaque, and which requires dozens of formation or conditioning cycles to achieve maximum performance. Electrochemical precipitation processes are costly and represent a disproportionate share of the raw materials expense in nickel batteries.

Faber, in U.S. Pat. No. 3,436,267, described the use of ozone to produce a Ni(III) hydroxide type material. Faber describes the failure to produce a reaction by ozone contact with Ni(II) hydroxide, apparently in dried powder form, suspended in a neutral or alkaline liquid medium. Faber did succeed in an ozone reaction using dry powdered Ni(II) hydroxide without a liquid medium. Faber produced a Ni(III) hydroxide type battery material by oxidation of dry, finely divided Ni(II) hydroxide powder in a gas stream containing ozone and inert gas, at a temperature of between 20° C. and 110° C. The Faber process, it would appear ozonizes only a minute amount of the powder volume, primarily the surface of the Ni(II) hydroxide particles, even if small particles are used, and even if long exposure is allowed in combination with particle vibration. What is needed, is a process where a substantial portion of the Ni(II) hydroxide mass in the process is subjected to ozone contact, to provide optimum conversion to a Ni(III) hydroxide type material.

SUMMARY OF THE INVENTION

The above problems have been solved and the above need met, by providing about 5% to about 40% ozonation of an alkali metal cation containing aqueous slurry of hydrated Ni(II) hydroxide, at a pressure above atmospheric. More specifically, an alkali metal cation containing aqueous slurry of hydrated $Ni(OH)_2$, having a pH of between 6.5 and 12.0, is ozonated wth an $O_3$-gas mixture, selected from an $O_3$-air or $O_3$-oxygen mixture, at a pressure preferably over 3 psig. and most preferably between about 3 psig. and about 20 psig., in an amount and for a time effective to form an ozonated Ni(III) hydroxide type material. This Ni(III) hydroxide type material comprises from about 60 wt.% to about 95 wt.% of unoxidized, hydrated $Ni(OH)_2$ and from about 5 wt.% to about 40 wt.% of Ni(IV) hydrated oxide interlayer doped with alkali metal cations. Optionally, minor amounts of $Co(OH)_2$ can be added to the Ni(III) hydroxide type material, after which the active battery material is filtered to provide a paste. The paste can then be loaded into suitable plaques for use as nickel electrode plates in, for example, an iron-nickel battery. The resulting paste is essentially pre-formed, and requires only one or two cycles of conditioning to achieve maximum electrochemical capacity, compared to non-oxonized nickel hydroxide which requires dozens of cycles of formation conditioning.

BRIEF DESCRIPTION OF THE DRAWINGS

For a better understanding of the invention, reference may be made to the preferred embodiments exemplary of the invention, shown in the accompanying drawings in which.

DESCRIPTION OF THE PREFERRED EMBODIMENT

One embodiment of a battery, utilizing the improved nickel electrode plate of the invention, would generally comprise a plurality of alternating positive nickel plates and negative plates such as, for example, loaded iron active material plates, with plate separators between the positive and negative plates, all contacted by alkaline electrolyte and housed in a case having a cover, a vent, and positive and negative terminals.

Figure 1:
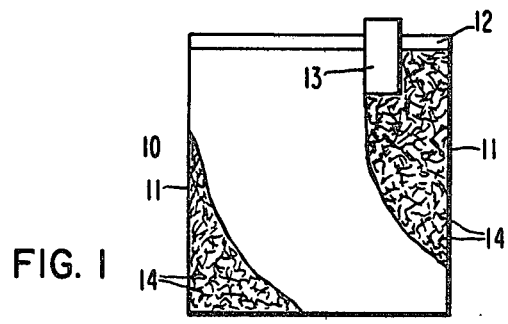
FIG. 1 shows one embodiment of an electrode plaque loaded with active battery material made by the method of this invention.

Preferred electrode plaques, shown in FIG. 1, are made from metal fibers, preferably nickel, or metal protective coated fibers, such as nickel coated steel or iron. The plaque 10, is a flexible, expansible, compacted sheet of relatively smooth, generally contacting, intermingled, metal fibers as shown at 11 in the body of the plaque. The plaque has, in the embodiment shown, top edge 12 coined to a high density. The coined area provides a base to which lead tab 13, which is attached to battery terminals, is spot welded. The plaque is preferably between about 85 percent and 95 percent porous. Activated nickel electrode material is loaded, generally in paste form, into the interstices of the body of this fibrous plaque to provide an electrode plate. This invention can, however, be used with other metallic plaque structures.

The metal fibers are preferably diffusion bonded in a protective atmosphere at temperatures below the melting point of the fibers used. In diffusion bonding, the fibers must not be melted, or non-porous volumes will be formed, reducing active material loading volume within the plaque. There should only be a metallurgical bond and interdiffusion of atoms across the fiber interface at fiber contact points 14 along the fiber lengths. Diffusion bonding provides a flexible, expansible electrode structure having a large pore volume into which active materials can be pasted or otherwise impregnated. Diffusion bonding also lowers the electrode plate resistance appreciably and thus the internal cell resistance in a finished cell.

The active material, which can be used as described hereinabove, is prepared by ozonation of an alkali metal cation containing aqueous slurry of hydrated Ni(II) hydroxide, i.e., $Ni(CH)_2 \cdot ZH_2O$ where $Z=0.3$ to 2.0, at a pressure above atmospheric. Commercially available $NiSO_4$, usually prepared by the treatment of nickel scrap, nickel power or nickel oxide with sulfuric acid, is reacted with a slight molar excess of alkali material, such as alkali hydroxide or alkali carbonate, to produce an alkaline containing precipitate of green Ni(II) hydroxide. Useful alkali hydroxide are potassium hydroxide, sodium hydroxide and lithium hydroxide. Useful alkali carbonates are potassium carbonate and sodium carbonate. The precipitate is washed to remove most of the alkali sulfate and provide a green alkaline containing slurry. Ni(NO$_3$)$_2$ may also be used as a starting material.

This slurry consists essentially of hydrated Ni(II) hydroxide and alkali metal cations selected from K$^+$, Na$^+$ and Li$^+$, depending on which alkali material was used to precipitate Ni(II) hydroxide. "Alkali metal" as used herein will mean commercially available alkali metal materials consisting of K$^+$, Na$^+$, and Li$^+$. At this point, these cations are not contained within the hydrated Ni(II) hydroxide lattice structure. The slurry has a pH of between 6.5 and 12.0, preferably between 7.5 and 9.0. If the pH is 6.5 or below, the Ni(II) hydroxide is slightly soluble in water and conversion to a Ni(III) hydroxide type battery material is incomplete. If the pH is greater than 12.0, it will cause significant ozone decomposition and inefficiency in the process.

The green alkali metal cation containing hydrated Ni(II) hydroxide slurry is then placed into a container having a gas inlet and outlet means. Preferably the green alkali cation containing hydrated Ni(II) hydroxide slurry is continuously agitated, usually by stirring or aeration, while in the container to provide a homogeneous composition. Next, an ozone-gas mixture, such as an ozone-air mixture or an ozone-oxygen mixture, containing about 6 vol.% of ozone, is fed into the container, usually by bubbling it under pressure from the bottom to the top and then out of the container.

The ozone-air or ozone-oxygen mixture intimately contacts substantially all of the alkali metal cation containing hydrated Ni(II) hydroxide mass throughout the container, causing the mass to turn from green to black, due to oxidation of a substantial amount of the nickel ions from the divalent to a higher valent state. The higher valent state nickel compound has the apparent formula:

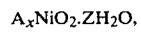

where A=Na, K or Li, Z=0.3 to 2.0 and x=0.002 to 0.02, i.e., interlayer-doped with from 0.2 to 2 atom % of A. The ozonized nickel hydroxide is a mixture of divalent and tetravalent nickel compounds herein described by the term "Ni(III) hydroxide". The tetravalent component is an alkali doped Ni(IV) hydrated oxide. The term "doped" is herein defined as meaning inclusion of cations in the interlayer lattice structure of the tetravalent nickel compound.

The ozonation reaction, i.e., contact of O$_3$ and alkali metal cation containing hydrated Ni(II) OH, is effective to cause the density of the active material to decrease, due to inclusion of minor amounts of alkali metal cations and water molecules within the nickel-oxygen interlayer of a substantial portion of the active material. Again, the term "Ni(III) hydroxide" is here meant to include such minor amounts of cations in the tetravalent component. These cation inclusions result in a large increase in electrical conductivity for the nickel active material, relative to the initial hydrated Ni(II) hydroxide, and allow the rapid electrochemical formation conditioning of the active material. The alkali metal cations are present in the range of from about 0.2 to about 2.0 atom percent in the alkali doped Ni(IV) hydrated oxide. This alkali cation doped tetravalent nickel compound is present in the range of between about 5 wt.% to about 40 wt.% after ozonation.

Preferably, the ozone-air or ozone-oxygen mixture is fed into the bottom of the container of alkali metal cation containing hydrated Ni(II) hydroxide slurry through a glass frit at a pressure of between 3 psig. and 20 psig., for an amount of time effective to cause Ni(III) hydroxide formation, usually from about 1 hour to about 6 hours. It is believed that the Ni(II) hydroxide starting material cannot be completely dried to exclude all water of hydration, or Ni(III) hydroxide will not form. Use of O$_3$-inert gas mixtures tends to result in the inert gas displacing O$_3$ in the aqueous medium. Use of atmospheric pressure would require an extremely long time to oxidize the Ni(II) hydroxide. Use of pressure over atmosphereic is essential to the process of this invention. Use of pressure over 20 psig. could result in the possibility of an explosion or in an "over ozonation" effect causing excessive oxidation.

The flow rate of the ozone-air or ozone-oxygen mixture through the alkali metal cation containing hydrated Ni(II) hydroxide slurry must be between about 25 cc./min. and about 1,000 cc./min. for each 1 liter of alkali metal cation containing hydrated Ni(II) hydroxide slurry. The preferred oxidation of divalent hydrated nickel hydroxide to a tetravalent nickel compound in the process of this invention is between about 5 wt.% to about 40 wt.% based on the weight of alkali metal cation containing hydrated Ni(II) hydroxide slurry. Extreme exposure times may cause an "over-ozination" effect, where interlayer water and cations may be lost. The operating temperature is usually about 20° C. to about 25° C. but can be as high as about 50° C.

The black Ni(III) hydroxide is removed from the container after effective ozonation. At this point, up to about 8 wt.%, i.e., from 0 to about 8 wt.%, preferably from about 3 wt.% to about 5 wt.% of Co(OH)$_2$, preferably in hydrated form, i.e., Co(OH)$_2$.ZH$_2$O where Z=0.3 to 1.0, based on Ni(III) hydroxide weight, can be added to the Ni(III) hydroxide to further enhance the electrical performance of the active battery material. This cobalt additive does not enter the lattice structure. The active battery material is then filtered to a paste consistency. The active battery paste can then be loaded into a suitable battery plaque, such as a nickel plated fiber metal plaque. The loaded plaque is then cycled in 25% KOH electrolyte to condition the active material and provide a high performance positive electrode plate that can be used in high performance batteries.

EXAMPLE 1

Freshly precipitated hydrated Ni(II) hydroxide, formed by reacting NiSO$_4$ with a 7.5% molar excess of KOH, i.e., Ni(OH$_2$ZH$_2$O where Z is about 2.0, was washed with water to remove potassium sulfate, and filtered to provide an alkali metal containing green slurry having a pH of 8. Twenty grams of the alkali metal containing hydrated Ni(II) hydroxide slurry was poured into a thick walled pyrex glass container having a 1" diameter glass frit bottom and a top gas pressure release valve. The volume of the container was 0.17 liter and its height was approximately 12 inches. Stainless steel tubing was connected from the frit bottom to a cylinder of ozonized air, produced by glow discharge, and containing about 6 vol.% ozone. About 25 cc./min. of the ozone-air mixture, at 15 psig. pressure, was bubbled through the alkali metal containing slurry in the container, i.e., about 150 cc./min./liter of slurry. The stirring effect caused by the gas passing through the frit generated sufficient agitation of the small volume so that no additional stirring was needed. After 3 hours the ozonation was stopped. By this time the slurry had turned to a black color, indicating formation of a Ni(III) hydroxide type material comprising unoxidized divalent nickel hydroxide and alkali doped tetravalent nickel material.

Then, 100 grams of Ni(III) hydroxide so produced was filtered to a paste consistency. It was then pasted into a nickel plated fiber metal plaque having an area of about 54 sq. in. The plaque was then pressed at about 4,000 lb./sq. in. to a final thickness of about 0.08 in., to achieve an active material loading of about 1.8 g./sq. in. of plaque surface area. A small portion of excess Ni(III) hydroxide was dried and processed through an iodine thiosulfate titration process to determine the percentage of divalent and tetravalent materials. Results indicated about 80 wt.% of hydrated Ni(II) hydroxide and about 20 wt.% of higher valence state, oxidized nickel compound. Additionally, another small sample of excess, dried Ni(III) hydroxide was dried and subjected to emission spectroscopy techniques. These tests showed a hydrated Ni(IV) oxide having a concentration of potassium cation in the lattice of about 1.0 atom percent. From these tests, the formula of the Ni(IV) oxide that was formed was found to be $K_{0.01}NiO_2.ZH_2O$ where $Z = 0.3$ to $2.0$.

Figure 2:
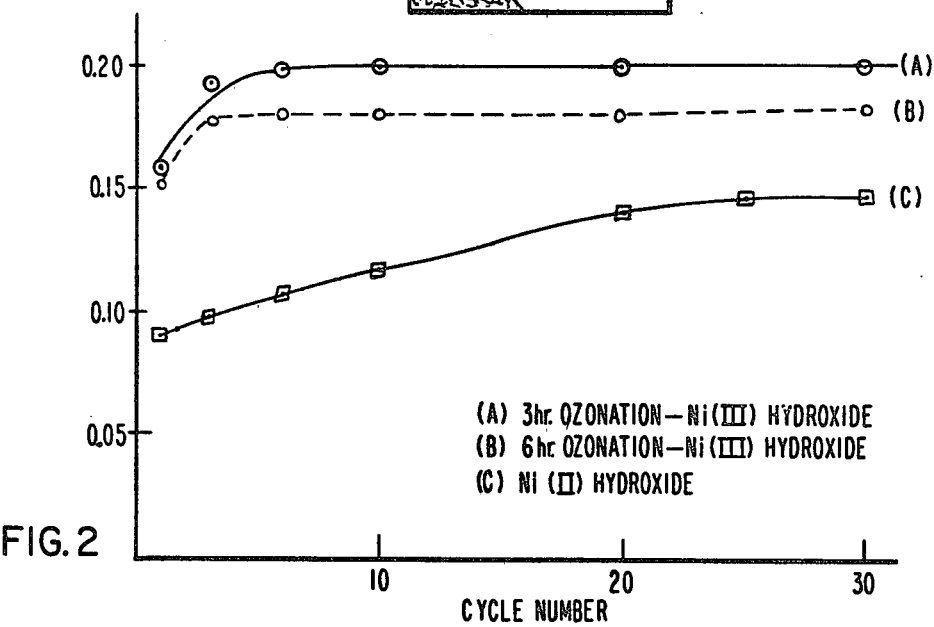
FIG. 2 is a graph showing the electrochemical utilization of non-organized nickel hydroxide and ozonized nickel hydroxide.

The nickel hydroxide electrode was set opposite a negative iron electrode in a container and contacted with 25% KOH electrolyte to form an electrochemical cell. The nickel hydroxide electrode was formed, i.e., charge and discharge cycled versus iron negative electrodes of about the same size and capacity. The nickel hydroxide electrode was charged at a current density of 160 mA./sq. in. and discharged at the same rate. Measurements were taken on a voltmeter to determine the electrochemical output in amp.-hr./gram Ni(III) hydroxide after 1 to 30 cycles, Sample (A). In a similar fashion, the same readings were taken on a nickel hydroxide electrode which contained Ni(III) hydroxide formed during a much longer 6 hour ozonation process, Sample (B), which contained about 40 wt.% of the 1.0 atom % potassium doped Ni(IV) hydrated oxide. Also, as a control, the same readings were taken on a nickel hydroxide electrode which contained Ni(III) hydroxide that was not oxidized by the ozonation process, Sample (C). The results are shown in FIG. 2 of the Drawings, where the curve (A), (B) and (C) correspond to Samples (A), (B) and (C) respectively.

EXAMPLE 2

Freshly precipitated hydrated Ni(II) hydroxide, formed by reacting $NiSO_4$ with a 7.5% molar excess of KOH, i.e., $Ni(OH)_2.ZH_2O$, where Z is about 2.0, was washed with water to remove potassium sulfate, and filtered to provide an alkali metal containing green slurry having a pH of 8. Twenty grams of the alkali metal containing hydrated Ni(II) hydroxide slurry was poured into a thick walled pyrex glass container having a 1" diameter glass frit bottom and a top gas pressure release valve. The volume of the container was 0.17 liter and its height was approximately 12 inches. Stainless steel tubing was connected from the frit bottom to a cylinder of ozonized air, produced by arc discharge, and containing about 6 vol.% ozone. About 25 cc./min. of the ozone-air mixture, at 15 psig. pressure, was bubbled through the alkali metal containing slurry in the container, i.e., about 175 cc./min./liter of slurry. The effervescent effect caused by the gas passing through the frit generated sufficient agitation of the small volume so that no additional stirring was needed. After 3 hours the ozonation was stopped. By this time the slurry had turned to a black color, indicating formation of a Ni(III) hydroxide. The oxidation and materials formed in this example would be similar to that of EXAMPLE 1, i.e., about 80 wt.% Ni(II) hydroxide and about 20 wt.% higher valence state alkali doped, oxidized nickel compound.

About 100 grams of Ni(III) hydroxide was removed from the container. Then 0.6 gram of hydrated Co(OH)$_2$ was added, to provide a 3 wt.% Co(OH)$_2$ concentration. The active battery material was then filtered to a paste consistency. It was then pasted into a nickel plated fiber metal plaque having an area of about 54 sq. in. The plaque was then pressed at about 4,000 lb./sq. in. to a final thickness of about 0.08 in., to achieve an active material loading of about 1.8 g/sq. in. of plaque surface area.

The nickel hydroxide electrode was set opposite a negative iron electrode in a container and contacted with 25% KOH electrolyte to form an electrochemical cell. The nickel hydroxide electrode was formed, i.e., charge and discharge cycled versus iron negative electrodes of about the same size and capacity. The nickel hydroxide electrode was charged at a current density of 160 mA./sq. in. and discharged at the same rate. Measurements were taken on a voltmeter to determine the electrochemical output in amp.-hr./gram Ni(III) hydroxide after 1 to 30 cycles, Sample (A). In a similar fashion, the same readings were taken on a nickel hydroxide electrode whose active material contained 0.9 grams (4.5 wt.%) hydrated Co(OH)$_2$, Sample (B); and on a nickel hydroxide electrode whose Ni(III) hydroxide was formed during a 6 hour ozonation process, and whose active material contained 0.9 grams (4.5 wt.%) hydrated Co(OH)$_2$, Sample (C). Also, so a control, the same readings were taken on a nickel hydroxide electrode which contained Ni(III) hydroxide that was ozonized for 3 hours but contained Co(OH$_2$) Sample (D). The results are shown in FIG. 3 of the Drawings, where the curves (A), (B), (C) and (D) correspond to Samples (A), (B), (C) and (D) respectively.

Figure 3:
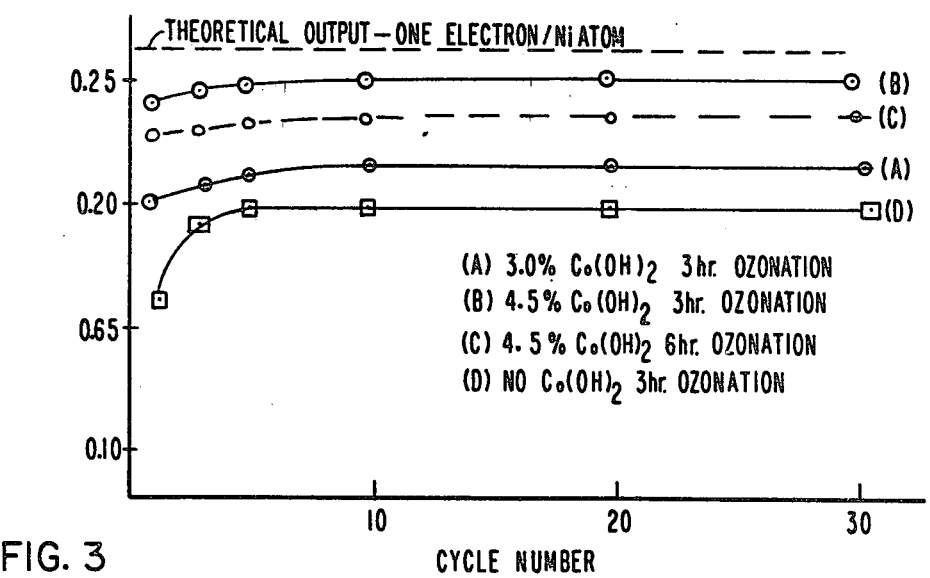
FIG. 3 is a graph showing the effect of $Co(OH)_2$ additive on the electrochemical utilization of ozonized nickel hydroxide.

As can be seen from FIGS. 2 and 3 of the Drawings, all of the electrodes containing at least 20 wt.% Ni(IV) hydrated oxide doped with 1.0 atom percent of interlayer potassium cation reached maximum capacity after only about 2 cycles. They all provided higher capacity than the electrode containing 100 wt.% hydrated Ni(II) hydroxide, Sample (C) of FIG. 2 which required 24 cycles to reach optimum capacity. In addition, FIG. 3 shows that the outstanding active material provided after 3 hour ozonation can be even more improved by addition of hydrated Co(OH)$_2$, Sample (D) versus Sample (B) of FIG. 3, where Sample (D) with 4.5 wt.% of hydrated Co(OH)$_2$ and 3 hours of ozonation approaches the theoretical output shown. Substitution of sodium or lithium in the $NiO_2.ZH_2O$:alkali cation component would provide equally outstanding results.

We claim:

1. A method of making a high capacity battery material comprising the steps:

(A) providing a slurry of hydrated Ni(OH)$_2$, containing alkali metal cation selected from the group consisting of potassium cation, sodium cation and lithium cation, formed by treatment of a nickel compound selected from the group consisting of NiSO$_4$ and Ni(NO$_3$)$_2$ with a molar excess of an alkali material selected from the group consisting of potassium hydroxide, sodium hydroxide, lithium hydroxide, potassium carbonate and sodium carbonate and then washing with water, to provide a slurry having a pH of between about 6.5 and 12.0, and (B) contacting the slurry with an ozone-air or ozone-oxygen gas mixture at a flow rate of between about 25 cc./min. and about 1,000 cc./min. for each liter of alkali metal containing slurry, at a pressure between about 3 psig. and about 20 psig., for a time effective to form an ozonated material consisting essentially of:

(a) about 60 wt.% to about 95 wt.% of hydrated Ni(OH)$_2$, and (b) about 5 wt.% to about 40 wt.% of Ni(IV) hydrated oxide interlayer doped with alkali metal cation selected from the group consisting of potassium cation, sodium cation, and lithium cation, where the cation in the interlayer of the Ni(IV) hydrated oxide is the same as the cation contained in the slurry of hydrated Ni(OH)$_2$.

2. The method of claim 1, wherein the Ni(IV) hydrated oxide component formed in step (B) is interlayer doped with from about 0.2 atom % to about 2.0 atom % of alkali metal cation, the slurry of hydrated Ni(OH)$_2$, containing alkali metal cation, is a green colored material and is formed by treatment of NiSO$_4$ with about a 7.5 molar excess of alkali material, the ozonated material is a black colored material, and where the ozone-air or ozone-oxygen gas mixture contains about 6 vol. % ozone.

3. The method of claim 1, where about 3 wt.% to about 5 wt.% of Co(OH)$_2$ is added to the battery material formed after step (B).

4. The method of claim 1, containing the additional step of loading the battery material formed after step (B) into an electrode plaque.

* * * * *